US006081201A

United States Patent [19]

Yoshinori

[11] Patent Number: 6,081,201

[45] Date of Patent: Jun. 27, 2000

[54] SELECTIVE CALL RECEIVING APPARATUS WITH MULTI-CALL-ALARMING UNITS

[75] Inventor: Miyajima Yoshinori, Yokohama, Japan

[73] Assignee: Matsushita Electric Industrial Co., Ltd., Japan

[21] Appl. No.: 08/820,034

[22] Filed: Mar. 19, 1997

[30] Foreign Application Priority Data

May 28, 1996 [JP] Japan .................................... 8-133531

[51] Int. Cl.[7] ........................................ H04Q 7/00

[52] U.S. Cl. ................................ 340/825.44; 340/825.34; 340/825.22; 340/825.46; 340/825.47; 455/38.1

[58] Field of Search ......................... 340/825.44, 825.34, 340/825.22, 825.46, 825.47; 455/38.1

[56] References Cited

U.S. PATENT DOCUMENTS

| | | | |
|---|---|---|---|
| 4,851,829 | 7/1989 | DeLuca et al. | 340/825.44 |
| 4,868,561 | 9/1989 | Davis | 340/825.44 |
| 4,918,438 | 4/1990 | Yamasaki | 340/825.44 |
| 5,332,994 | 7/1994 | Kawashima et al. | 340/825.44 |
| 5,394,140 | 2/1995 | Wong et al. | 340/825.44 |

FOREIGN PATENT DOCUMENTS

| | | |
|---|---|---|
| 5-55985 | 3/1993 | Japan . |

*Primary Examiner*—Brian Zimmerman
*Assistant Examiner*—Yves Dalencourt
*Attorney, Agent, or Firm*—Parkhurst & Wendel, L.L.P

[57] ABSTRACT

A selective call receiving apparatus includes a receiving ckt for receiving a radio wave communication signal, plural kinds of alarming units for alarming a user respectively, a memory for storing first data regarding one of the kinds of alarming units to be firstly operated in response to a call and second data regarding another alarming unit to be secondly operated in response to the call, and a timer. A first control device operates one of the kinds of alarming units according to the first data and operates the timer when there is the call. An operation circuit receives an operation by the user and a second control device operates another alarming unit according to the second data if the operation circuit does not receive the operation until the timer detects that the predetermined interval has passed. The first control portion operates the timer again when the second control portion operates another alarming unit and a third control portion stores the second data in the memory as the first data when the operation circuit receives the operation before the timer detects the predetermined interval has passed from when the second control portion operates the another alarming unit, and the first control portion operates another alarming unit according to the first data when the receiving circuit receives a next call.

3 Claims, 3 Drawing Sheets

SELECTIVE CALL RECEIVING APPARATUS WITH MULTI-CALL-ALARMING UNITS

BACKGROUND OF THE INVENTION

1. Field of the Invention

This invention relates to a selective call receiving apparatus with multi-call-alarming units.

2. Description of the Prior Art

A selective call receiving apparatus, i.e., a pager, having a plurality of kinds of alarming units is known. Such a conventional pager operates one of kinds of alarming units selected by the user when a radio wave communication signal directing to this pager is received. Moreover, Japanese patent application provisional publication No. 5-55985 discloses a pager having a plurality of kinds of alarming units. In this conventional pager, the user can switch a first kind of alarming units to a second kind of alarming units through a manual operation. After predetermined interval has passed, the alarming unit to be operated in response to the next call is returned from the second kind of the alarming unit to the first kind of alarming unit.

SUMMARY OF THE INVENTION

The aim of the present invention is to provide an improved selective call receiving apparatus.

According to the present invention a selective call receiving apparatus is provided which comprises: a receiving circuit for receiving a radio wave communication signal; a plurality of kinds of alarming units for alarming a user respectively; a storing portion for storing first data regarding one of the kinds of alarming units to be firstly operated in response to a call through the radio wave communication signal from the receiving circuit and second data regarding another one of the kinds of alarming units to be secondly operated in response to the call; a timer; a first control portion for operating one of kinds of alarming units in accordance with the first data and operating the timer when there is the call; an operation circuit for receiving an operation by the user; and a second control portion for operating another one of kinds of alarming units in accordance with the second data if the operation circuit does not receive the operation until the timer detects that a predetermined interval has passed.

In this selective call receiving apparatus, the first control portion stops alarming by one of kinds of alarming units when the operation circuit receives the operation before the timer detects that the predetermined interval has passed and when the operation circuit does not receive until the timer detects that the predetermined interval has passed.

Moreover, this selective call receiving apparatus may further comprise a third control portion and the second control portion operates the timer again when the second control portion operates another one of kinds of alarming units and the third control portion stores the second data in the storing portion as the first data when the operation circuit receives the operation before the timer detects the predetermined interval has passed from when the second control portion operates another one of kinds of alarming unit, and the first control portion operates another one of kinds of the alarming units in accordance with the first data when the receiving circuit receives a next call after the second storing portion stores the second data in the storing portion as the first data.

Moreover, this selective call receiving apparatus may further comprise an input portion responsive to another operation of the user for receiving the first and second data and stores the first and second data in the storing portion.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

Figure 1:
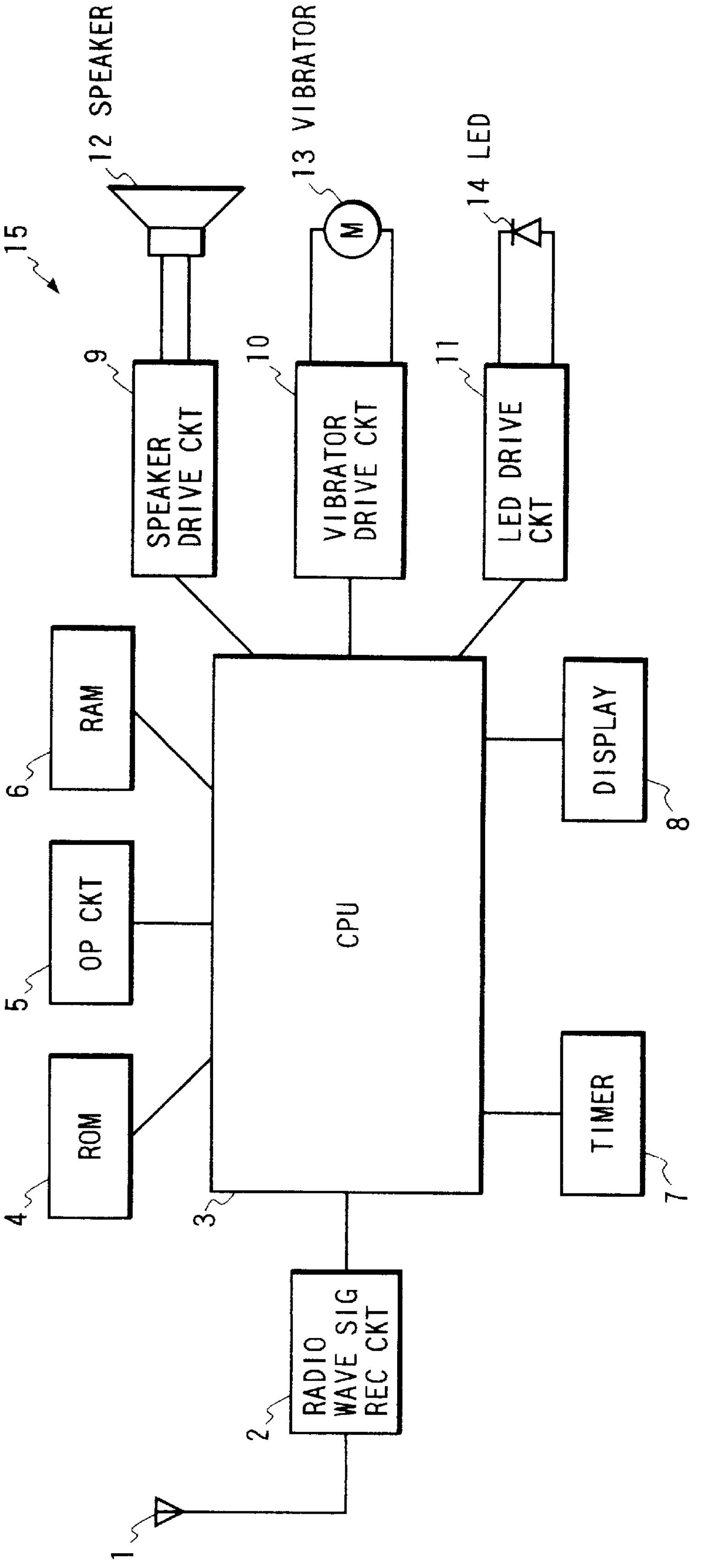
FIG. 1 is a block diagram of a selective call receiver of this embodiment.

Hereinbelow will be described an embodiment of this invention. FIG. 1 is a block diagram of a selective call receiver of this embodiment.

A selective call receiving apparatus of this embodiment comprises an antenna 1 for receiving a radio wave signal including a call signal and message data and outputting a baseband signal, a cpu (central processing unit) 3 for receiving the baseband signal from the radio wave signal receiving circuit 2 and effecting processings for a calling operation and displaying message data, a rom (read-only-memory) 4 for storing data of programs for the processing mentioned above, identification data of this selective call receiving apparatus, and data necessary for the processings, an operation circuit 5 for receiving an operation by a user and generating a command signal for stopping an alarm, inputting data regarding kinds of alarming units to be operated, displaying the message data or the like, a ram (random access memory) 6 for storing data such as the identification data in the call signal and message data included in the radio wave signal, and data necessary for alarming operation, a display 8 for displaying the message data received, an alarming portion 15 including a plurality of kinds of alarming unit such as a speaker 12, a vibrator 13, an LED (light emission diode) 14 and accompanied drive circuits 9 to 11, a timer 7 for detecting that time has passed for a predetermined interval.

The antenna 1 receives the radio wave signal including the call signal and the message data transmitted from a base station (not shown) and outputs the baseband signal including the call signal and the message data. The call signal includes an identification data for calling. The cpu 3 receives the baseband signal from the radio wave signal receiving circuit 2 and effects processings for the alarming operations and displays message data on the display 8 when the received radio wave signal received is directed to this selective call receiving apparatus. The rom 4 stores the data of programs for the processings for the message displaying and the alarming operations and the identification data assigned to this selective call receiving apparatus, and the data necessary for the processings such as data regarding the kinds of alarming unit originally set and initial data of one of the plurality of alarming units to be operated. The operation circuit 5 receives an operation by a user and generates command signals for stopping an alarm, receiving data regarding the kinds of alarming units to be operated, and displaying the message data or the like. The ram 6 stores the received identification data, the received message data when the identification data in the ram 6 agrees with the identification data in the rom 4, and the data necessary for the alarming operations. The display 8 displays the received message data when the identification data in the ram 6 agrees with the identification data in the rom 4. The alarming portion 15 including a plurality of kinds of alarming units. The speaker 12 is driven by the speaker drive circuit 9 in response to the cpu 3. The vibrator 13 is driven by the vibrator drive circuit 10 in response to the cpu 3. The LED 14 is driven by the LED drive circuit 11 in response to the cpu 3.

The timer 7 detects that time has passed for the predetermined interval in response to the cpu 3 and outputs a timing signal indicating that time has passed for the predetermined interval. The data regarding the kinds of alarming unit originally set in rom 4 is stored in the ram 6 at an initializing of the cpu 3.

Figure 2:
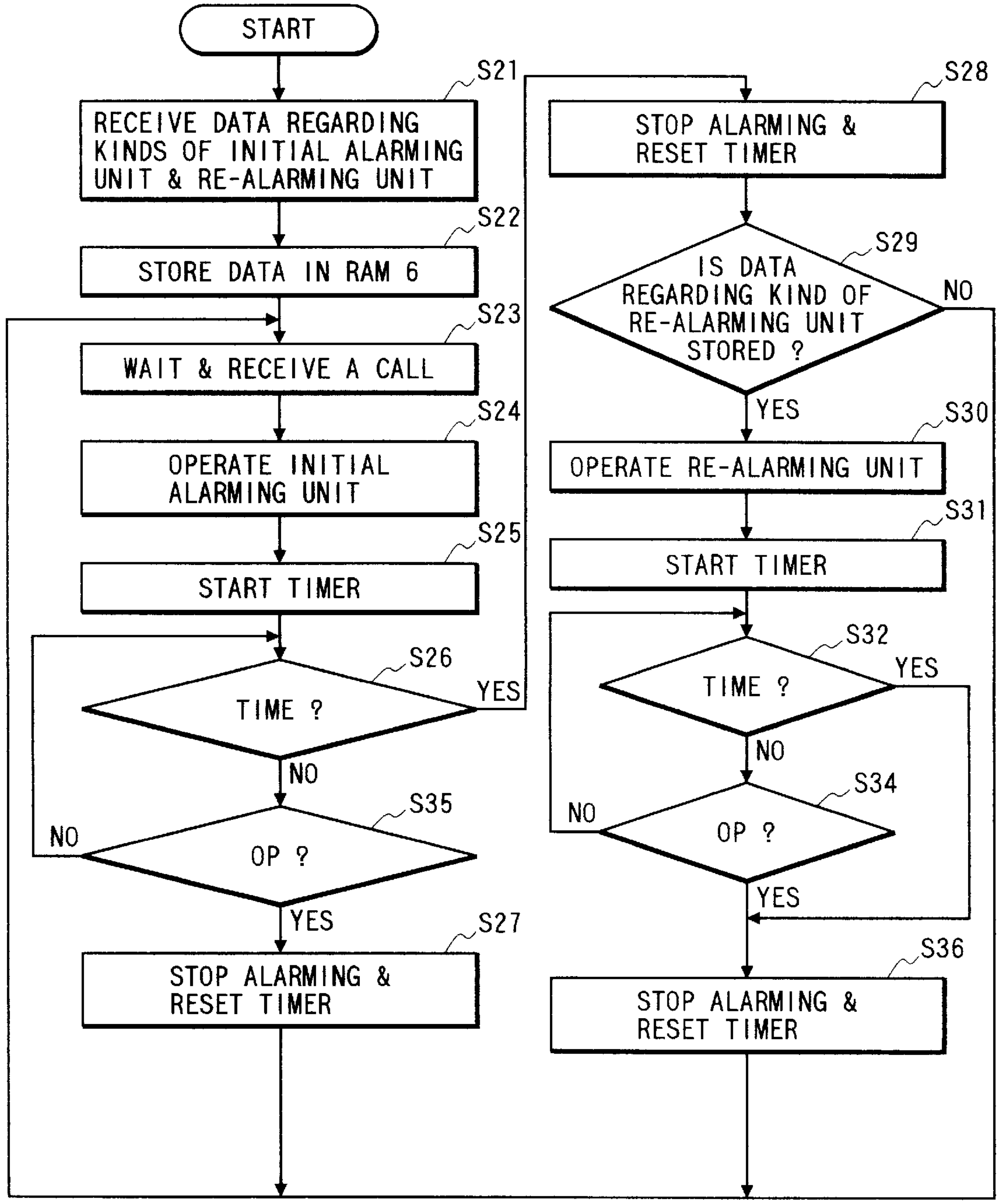
FIG. 2 depicts a flow chart of this embodiment showing an alarming operation.

FIG. 2 depicts a flow chart of this embodiment showing an alarming operation.

In step s21, the cpu 3 receives data regarding one of alarming units (the speaker 12) as an initial alarming unit which is to be firstly operated in response to the call and data regarding a re-alarming unit (vibrator 13) which is to be secondly operated in response to the call and, in step s22, the cpu 3 stores the data regarding the initial alarming unit, "12", and the re-alarming unit, "13" in the ram 6.

If the user finishes this inputting operation without inputting the data regarding the re-alarming unit, only data having value "12" is stored. If the user finishes this inputting operation without inputting the data regarding both the initial alarming unit and the re-alarming unit, the originally set data stored in the ram 6 at the initializing are used.

The cpu 3 waits and receives a call in step s23. When the cpu 3 receives a call directing to this selective call receiving apparatus in step s23, the cpu 3 operates the initial alarming unit, that is, the speaker 12 in step s24. Then, the cpu 3 starts the timer 7 in step s25.

In the following step s26, the cpu 3 determines whether time has passed for the predetermined interval by checking the timer 7 in step s26. If time has not passed for the predetermined interval, in step s35, the cpu 3 determines whether the user operates the operation circuit 5 to stop alarming. If the user operates the operation circuit 5 to stop alarming in step s35, the cpu 3 stops alarming and resets the timer 7 in step s27 and processing returns to step s23.

If the user does not operate the operation circuit 5 to stop alarming in step s35, processing returns to step s26.

In step s26, if time has passed for the predetermined interval, the cpu 3 stops alarming and resets the timer 7 in step s28.

In the following step s29, the cpu 3 determines whether data regarding the kind of the re-alarming unit is stored in the ram 6. If the data regarding the kind of the re-alarming unit is stored in the ram 6, the cpu 3 operates the re-alarming unit, that is, the vibrator 13 in step s30 and starts the timer 7 in step s31.

In the following step s32, the cpu 3 starts the timer 7.

In the following step s32, the cpu determines whether time has passed for the predetermined interval by checking the timer 7. If time has not passed for the predetermined interval, in step s34, the cpu 3 determines whether the user operates the operation circuit 5 to stop alarming. If the user operates the operation circuit 5 to stop alarming in step s34, the cpu 3 stops alarming and resets the timer 7 in step s36 and processing returns to step s23. In the step s32, if time has passed for the predetermined interval, in step s36, the cpu 3 stops alarming and resets the timer 7 in step s36 and processing returns to step s23.

In step s29, if the data regarding the kind of the re-alarming unit is not stored in the ram 6, that is, data other than "12" (speaker), "13" (vibrator), "14" (LED) is stored, processing returns to step s23 to wait a next call.

A modification will be described.

Figure 3:
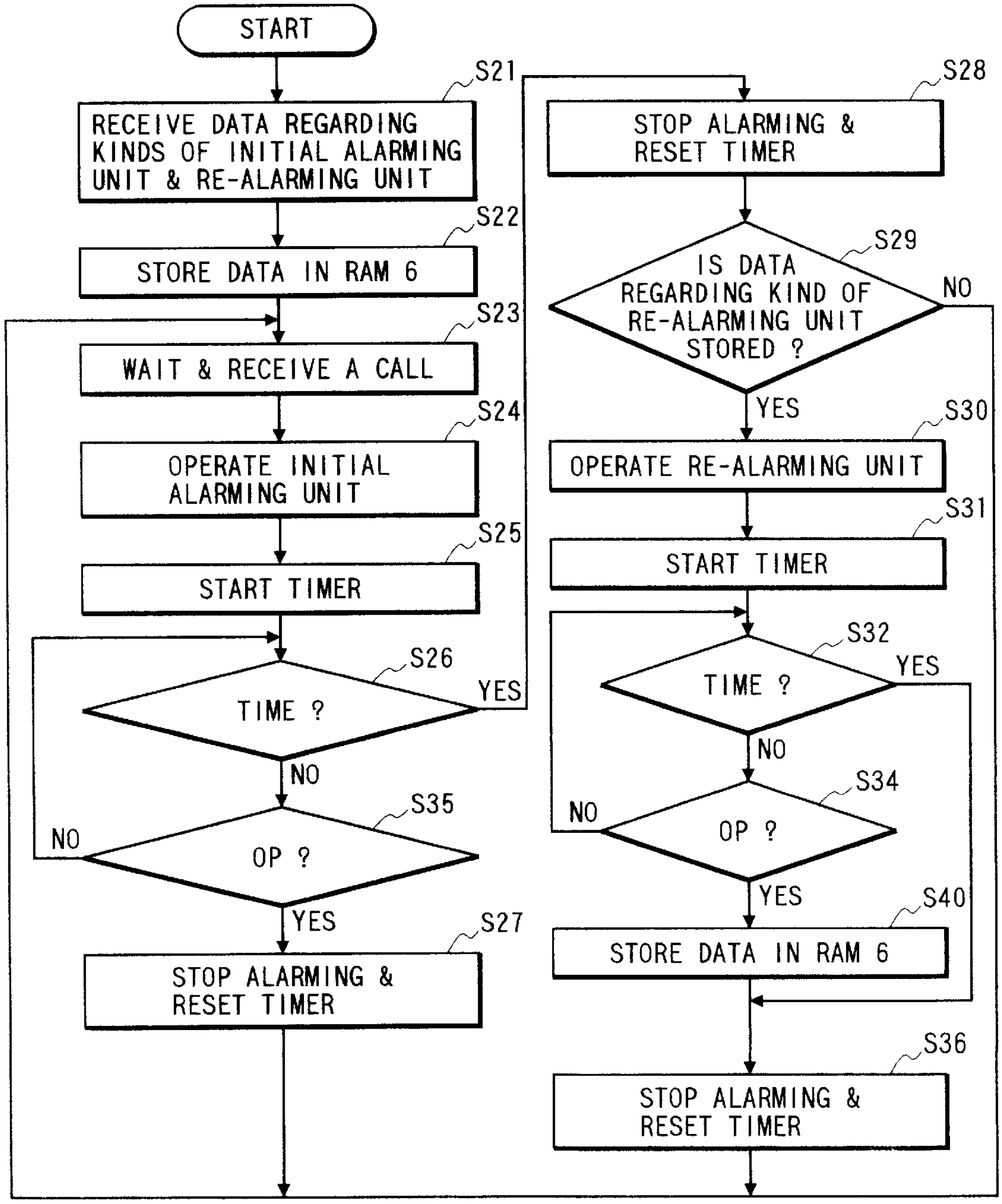
FIG. 3 depicts a flow chart of a modification showing an alarming operation.

FIG. 3 depicts a flow chart of a modification showing an alarming operation.

In FIG. 3, most of all steps are similar to the steps shown in FIG. 2. The difference is that step s40 is inserted between steps s34 and s36.

In step s40, in response to the operation to stop the alarming unit secondly operated, the cpu 3 renews the data regarding to the initial alarming unit such that the kind of the initial alarming unit is changed from the speaker 12 to the vibrator 13 which successes to alarm the user of the arriving call, that is, the user is informed of the arrival of the call by the vibrator 13 and operates the operation circuit 5 to stop the alarming. Then, when a next call arrives, the cpu 3 operates the vibrator 13 as the initial alarming unit in step s24. If the user stops alarming in step s27, the data regarding the kind of the initial alarming unit in the ram 6 is not renewed, so that the kind of the initial alarming unit is not changed.

In this embodiment, the alarming operation is described with the speaker 12 and the vibrator 13. However, switching the kind of the alarming units among more than two kinds of alarming can be also provided.

What is claimed is:

1. A selective call receiving apparatus comprising:

receiving means for receiving a radio wave communication signal;

a plurality of different alarming means for alarming a user respectively;

storing means for storing first data regarding one of said different alarming means to be firstly operated in response to a call through said radio wave communication signal from said receiving means and second data regarding another one of said different alarming means to be secondly operated in response to said call;

timer means;

first control means for operating said one of said different alarming means in accordance with said first data and operating said timer means when there is a call;

operation means for receiving an operation by said user;

second control means responsive to said timer means and said operation means for operating another one of said different alarming means in accordance with said second data if said operation means does not receive said operation until said timer means detects that a predetermined interval has passed; and, third control means, wherein said second control means operates said timer again when said second control means operates said another one of said different alarming means and said third control means stores said second data in said storing means as said first data when said operation means receives said operation before said timer means detects said predetermined interval has passed from when said second control means operates said another one of said different alarming means, and said first control means operates said another one of said different alarming means in accordance with said first data when said receiving means receives a next call after said second storing means stores said second data in said storing means as said first data.

2. A selective call receiving apparatus as claimed in claim 1, wherein said first control means stops alarming by said one of said different alarming means when said operation means recieves said operation before said timer detects that said predetermined interval has passed and when said operation means does not receive until said timer detects that said predetermined interval has passed.

3. A selective call receiving apparatus as claimed in claim 1, further comprising input means responsive to another operation of said user for receiving said first and second data and stores said first and second data in said storing means.

* * * * *

UNITED STATES PATENT AND TRADEMARK OFFICE

CERTIFICATE OF CORRECTION

PATENT NO. : 6,081,201

DATED : June 27, 2000

INVENTOR(S) : Yoshinori MIYAJIMA

It is certified that error appears in the above-identified patent and that said Letters Patent is hereby corrected as shown below:

On page 1, column 1, [75] Inventor: change "Miyajima Yoshinori" to --Yoshinori Miyajima-; and Signed and Sealed this Seventeenth Day of April, 2001

Attest:

Nicholas P. Godici

NICHOLAS P. GODICI

*Attesting Officer*

*Acting Director of the United States Patent and Trademark Office*